United States Patent [19]

Miller

[11] 4,077,553

[45] Mar. 7, 1978

[54] BOAT TRANSPORT ANCHORING DEVICE

[76] Inventor: Thomas J. Miller, 800 Lombard Ave., Evansville, Ind. 47715

[21] Appl. No.: 643,835

[22] Filed: Dec. 23, 1975

Related U.S. Application Data

[63] Continuation-in-part of Ser. No. 563,097, Mar. 28, 1975, abandoned, which is a continuation of Ser. No. 365,709, May 31, 1973, abandoned.

[51] Int. Cl.² .................................................. B60R 9/04
[52] U.S. Cl. ........................... 224/42.1 G; 224/42.1 E; 224/42.1 B; 105/477; 105/469; 280/179 A
[58] Field of Search ...................... 224/42.1 E, 42.1 F, 224/42.1 G, 42.1 R, 42.1 B, 29 R, 42.45 R; 403/44; 280/179 A, 179 R, 414 R, 47.13 B; 180/68.5; 248/503, 226 B, 226 D; 105/477, 469

[56] References Cited

U.S. PATENT DOCUMENTS

| | | | |
|---|---|---|---|
| 1,313,450 | 8/1919 | Beals | 403/44 |
| 2,473,114 | 6/1949 | Todd | 248/503 UX |
| 2,533,895 | 12/1950 | Raveau | 280/414 A UX |
| 2,586,485 | 2/1952 | Schroeder | 280/414 R UX |
| 2,589,772 | 3/1952 | Carter et al. | 224/42.1 E |
| 2,728,502 | 12/1955 | Plantico | 224/42.1 F |
| 2,775,381 | 12/1956 | Hare | 224/42.1 E |

FOREIGN PATENT DOCUMENTS

| | | | |
|---|---|---|---|
| 90,595 | 3/1961 | Denmark | 224/42.1 F |

Primary Examiner—Robert J. Spar
Assistant Examiner—Jerold M. Forsberg
Attorney, Agent, or Firm—Laurence R. Brown

[57] ABSTRACT

The present disclosure is directed to an anchoring device for retaining a boat on a trailer or on top of an automobile either directly on the top or secured to a previously installed car top carrier. The device consists of a plurality of units each of which has a trailer or car top securing means and a boat securing means connected by a turnbuckle means therebetween to control the tension. The structure of the present disclosure permits the boat to be transported in either the upright or inverted position.

9 Claims, 13 Drawing Figures

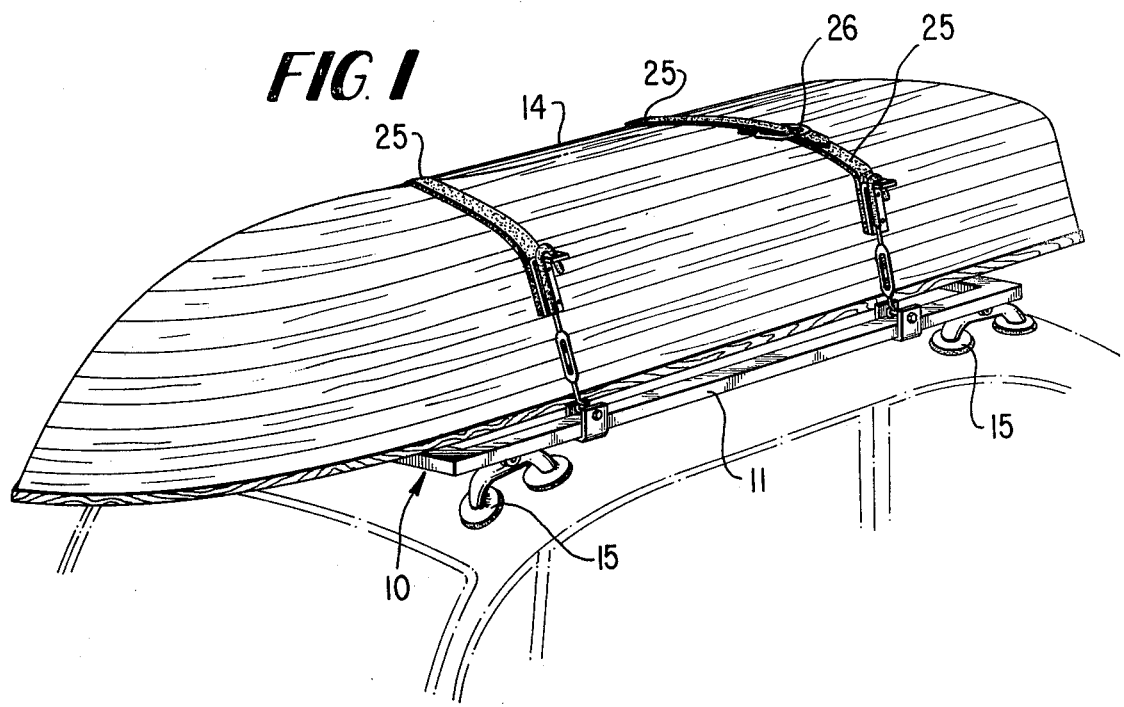
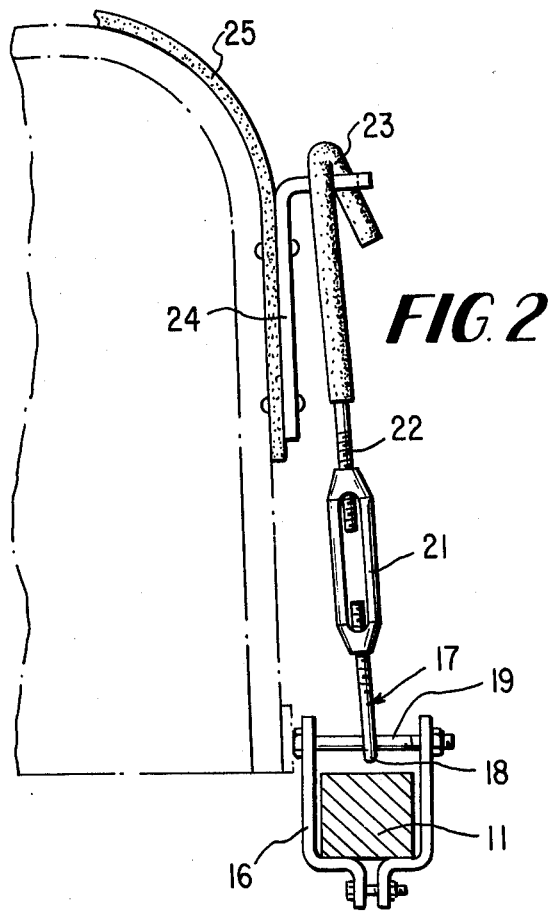
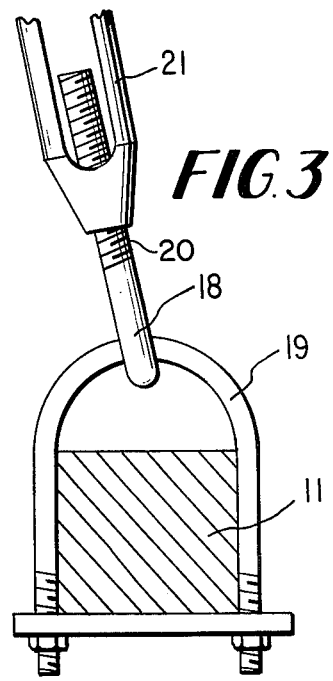

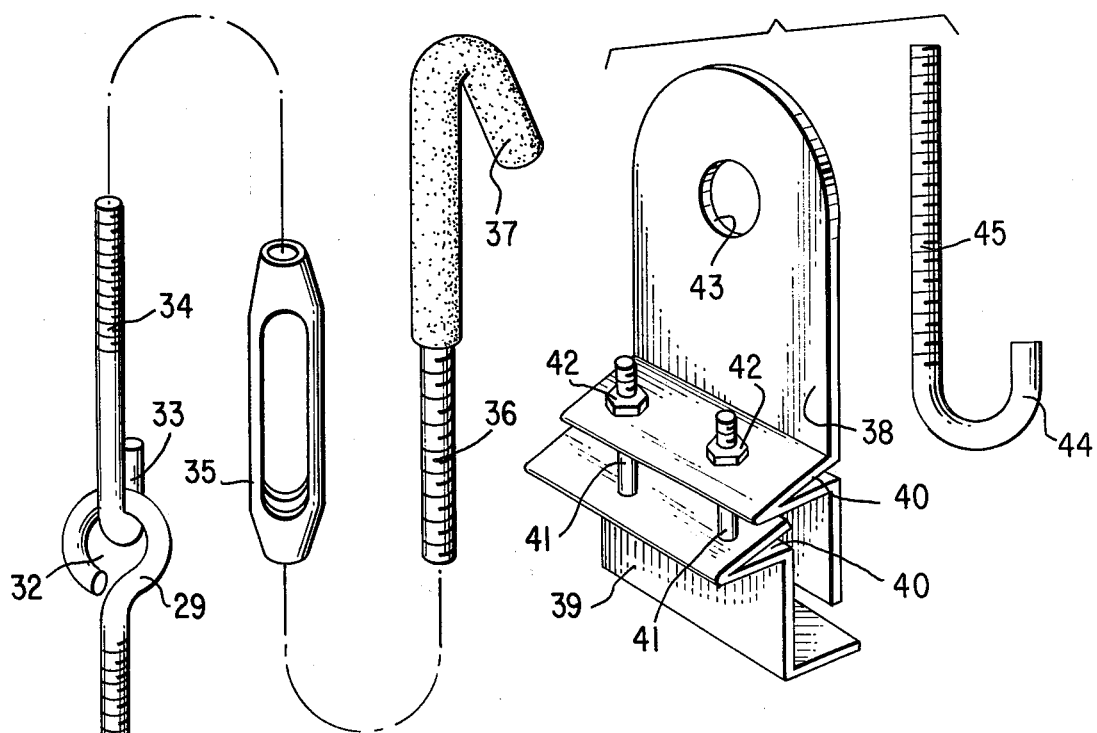
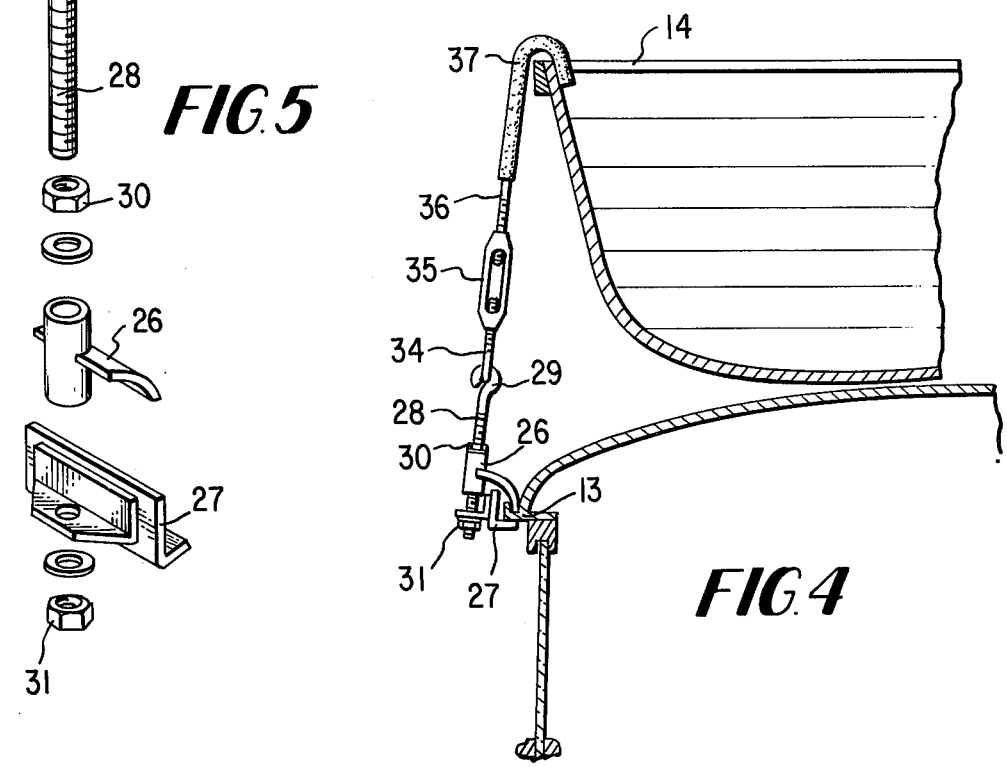

BOAT TRANSPORT ANCHORING DEVICE

The present application is a continuation-in-part of copending Ser. No. 563,097, filed Mar. 28, 1975, for BOAT TRANSPORT ANCHORING MEANS, (now abandoned), which in turn a continuation of U.S. Ser. No. 365,709, filed May 31, 1973, also abandoned. A further divisional application of Ser. No. 365,709 was filed Nov. 18, 1974 and issued as U.S. Pat. No.3,960,301 on June 1, 1976.

An object of the present invention is to provide an anchoring device for securing loads to trailers, trucks, car tops or car top carriers.

Another object of the present invention is to provide a boat anchoring device which may be secured at one end either directly to the vehicle top or a car top carrier and secured at its other end to the boat or boat restraining strap when the boat is being transported in an inverted condition.

Another object of the present invention is the provision of an anchoring device having two tension adjustable jaws for positive engagement with the rain gutters which run along each side of the top of the vehicle.

A further object of the invention is the provision of an adjustable strap having a steel buckle with locking teeth which provides adjustment according to boat size which strap is secured to a hook at one end of a turnbuckle and a jawed clamp at the other end of the turnbuckle.

A further object of the invention is the provision of a right-angled pressure plate or bracket affixed to each end of the belting, with the upper portion of the bracket being angled outwardly of the boat and apertured for receiving said hooks to permit pressure application downwardly to force the belting and pressure brackets tightly against the boat. Tensioning of the device is accomplished by tightening the turnbuckle means thereby causing the belting to tighten the pressure brackets which then hug the boat securely and prevent slippage of the boat relative to the carrier.

With the foregoing and other objects in view, the invention will be more fully described hereinafter and more particularly pointed out in the appended claims.

In the drawings in which like parts are denoted by reference characters throughout the several views:

FIG. 1 is a perspective view of a boat in an inverted position upon a car top transport rack retained in place by the present invention.

FIG. 2 is a fragmentary vertical transverse section taken through the anchoring device in the embodiment of FIG. 1.

FIG. 3 is a vertical sectional view of a modified form of car top carrier anchoring device.

FIG. 4 is a fragmentary vertical transverse section taken through a modified form of anchoring device employed when transporting a boat in an upright condition.

FIG. 5 is an exploded perspective view taken at an enlarged scale of the anchoring device of FIG. 4.

FIG. 6 is a perspective view of a modified form of rain gutter clamping device employed with the present invention.

Figure 7:
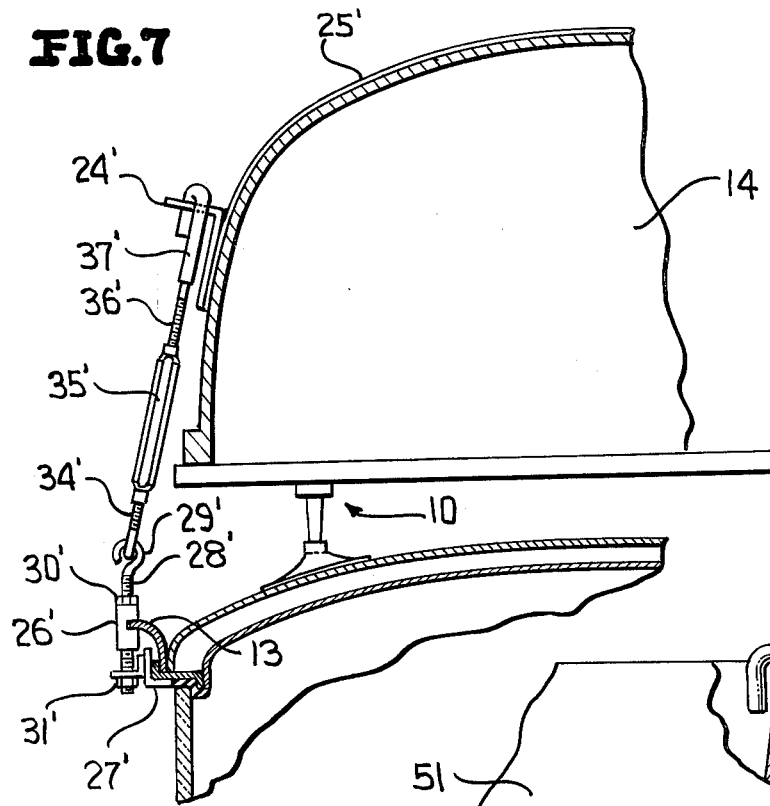
FIG. 7 is a view in section of a boat upside down on a car top carrier secured to the rain gutters.

Referring now to the drawings, the problem confronting the inventor herein is the transporting of a boat in either the inverted position of FIGS. 1 and 7 or the upright position of FIGS. 4 and 8–11 and either upon a car top carrier 10 having longitudinal or cross-bar runners 11 or as in FIG. 4, directly upon the car top 12, or as in FIGS. 8–11, directly on a trailer. The invention is applicable to any car top carrier whether the runners are longitudinal, diagonal, cars or otherwise.

The car top has rain gutters 13 which run along the top at each side of the vehicle.

Referring now to FIG. 1, a boat 14 is placed in an inverted condition upon the car top carrier 10, which carrier is carried upon suction cup mounts 15 and retained by conventional turnbuckles, straps and hooks of the type shown in U.S. Pat. No. 2,589,772. As best seen in FIG. 2, a bolted shackle 16 is bolted about the runners 11. An eye bolt 17 having an eye 18 passes about bolt 19 of the shackle 16. The shank 20 of the eye bolt 17 is threaded to matingly engage one end of a turnbuckle 21. The other end of turnbuckle 21 threadingly receives the threaded shank 22 of an anchoring hook 23 the reverse turn of which passes through an opening in an attaching bracket 24 which is secured to one end of a restraining strap 25, there being two such straps at each anchor point joined by a steel buckle 26 having locking teeth. In the embodiment shown in FIGS. 1 through 3, the boat 14 is placed in the inverted condition upon the rack 10 and the straps 25 secured firmly against the boat which makes a firm rough adjustment for retaining the boat on the rack. A firm vernier adjustment to assure right engagement of the boat against the rack is then attained by rotating the turnbuckle 21.

Referring now to FIGS. 4 and 5, a modified form of anchoring device is shown in which a two jaw adjustable clamp 26, 27 clamps about the rain gutters 13. These jaws 26, 27 are retained on a threaded shank 28 of a hook 29 by threaded nuts 30, 31. The eye 32 of the hook 29 is engaged by a hook 33 having a threaded shank 34 which mates with one end of a turnbuckle 35, the other end of which threadedly receives a shank 36 of a hook 37 which as best seen in FIG. 4, seats over the gunwale of the boat 14.

As best seen in FIG. 6, a modified form of clamp for locking to the rain gutters 13 is shown as being a two-piece plate structure 38, 39 having resilient folds 40 which are mated and compressed by bolts 41 and nuts 42 to cause the structure to lock about the rain gutter 13. The plate 38 has an opening 43 to receive the hook 44 of a threaded shank 45 which mates with a turnbuckle.

This alternate device is attached to the rain gutter by means of placing the depending portions of plates 38 and 39 on and under the rain gutter and tightening the nuts 42 which equalizes the pressure on top and bottom of the rain gutter. (The bottom edge of plate 38 fits into the top of the rain gutter, while the bottom of plate 39 fits outside underneath the rain gutter). Next, place threaded hook 44 into opening 43, and screw threads 45 into the bottom part of threaded sleeve 35, then use hook 37 by screwing threaded portion 36 into top part of threaded sleeve 35. This device can be used in the structure of FIG. 4 or FIG. 1 as an alternate clamping device on the rain gutter.

FIG. 7 shows the boat 14, carried on rack 10, in the inverted position, wherein attachment is made between the rain gutter 13 and attaching bracket 24' affixed to strap 25'. While the anchoring device of FIG. 4 may be employed in FIG. 7, a slightly modified connector is shown. Turnbuckle 35 has been replaced by hexagonal sleeve 35', which, while acting as a turnbuckle, provides the added advantage of rust inhibiting. Thus, jaws 26' and 27' grip gutter 13 with nuts 30' and 31', adjustable along shank 28', maintaining the gripping. Hook 29' engages the hooked end of shank 34' and hexagonal sleeve 35' receives threaded shank 36' of anchoring hook 37'.

Preferably, four such anchoring devices are used to carry the boat in the protected position illustrated.

While I have used the word boat I intend this to cover canoes or other watercraft as well as luggage or luggage transport containers.

Figure 8:
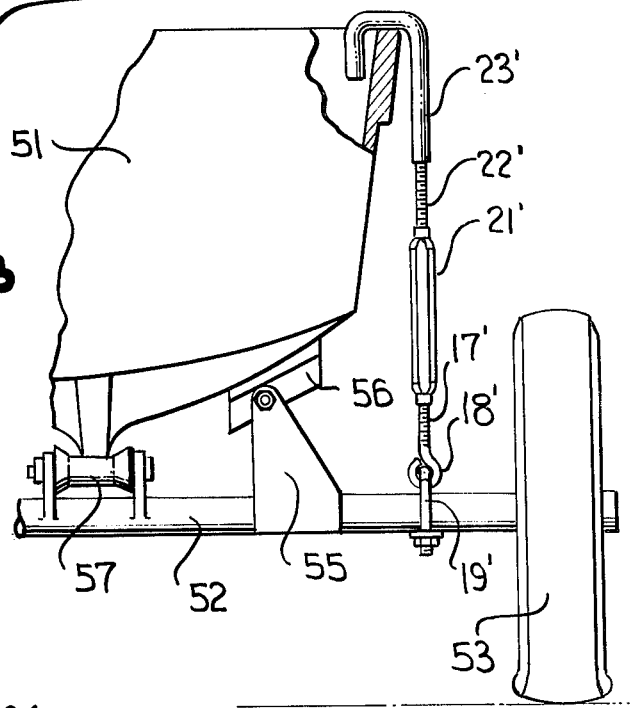
FIG. 8 is a rear end view of a relatively large boat secured to the axle of a trailer.

In FIG. 8 there is pictured a typical arrangement for anchoring a relatively large boat 51 to a trailer. The trailer includes an axle or cross frame member 52, tire 53, lateral support fulcrum 55 with pivotal support 56 mounted thereon, and keel support 57.

The anchoring device of the present invention resembles that pictured in FIG. 3, in that a U bolt 19' straddles the axle 52 and is tightened thereto. Eye bolt 17' has its eye 18' interlooped with U bolt 19' and its threaded shank engaged in hexagonal sleeve 21'. The anchor hook 23' engages the boat 51 over a gunwale thereof with its threaded shank 22' also engaged in hexagonal sleeve 21'. The anchoring device can be tightened as much as desired, even employing a hexagonal wrench where necessary for firmly securing the boat to the trailer. Preferably two such anchoring devices are used. However, four are appropriate where the boat is particularly heavy and double-axle trailers are employed. Usually the forward end of the trailer includes an upright and pulley arrangement for securing the boat forward.

The particular advantage of the arrangement of FIG. 8 lies in the fact that the pleasure boat is usually wider than the trailer frame and hence the axle connection.

Figure 9:
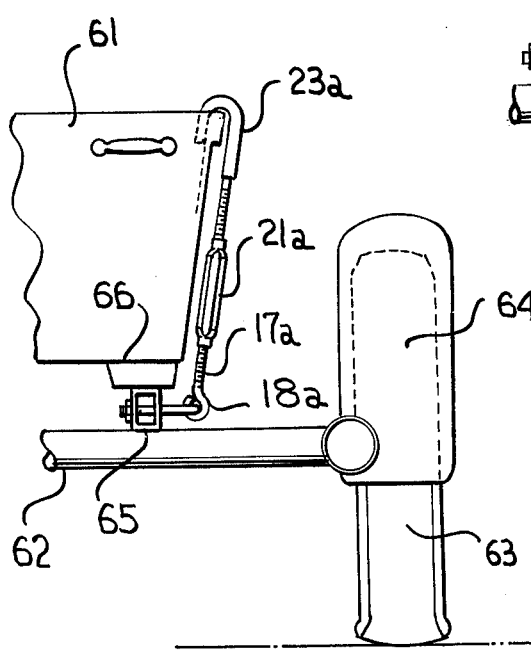
FIG. 9 is a rear end view of a relatively small boat secured to the frame of a trailer.
Figure 10:
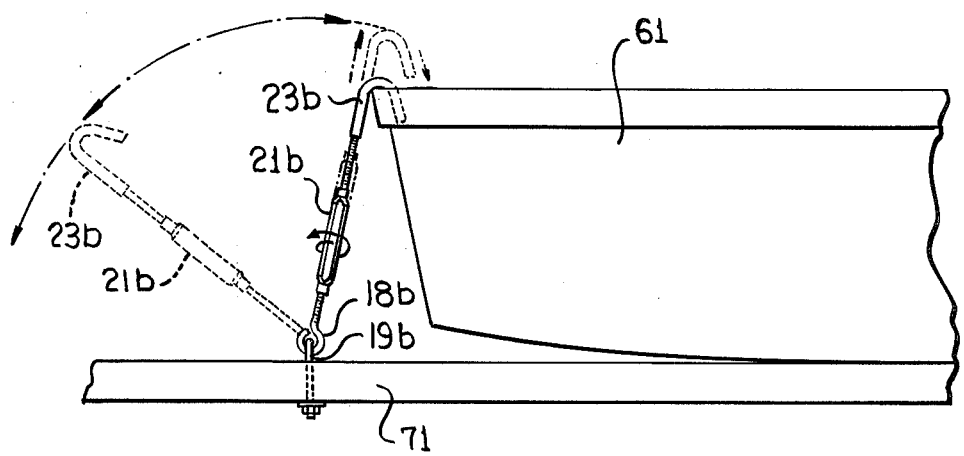
FIG. 10 shows the bow of a small boat or Jon type boat secured directly to the trailer frame.
Figure 11:
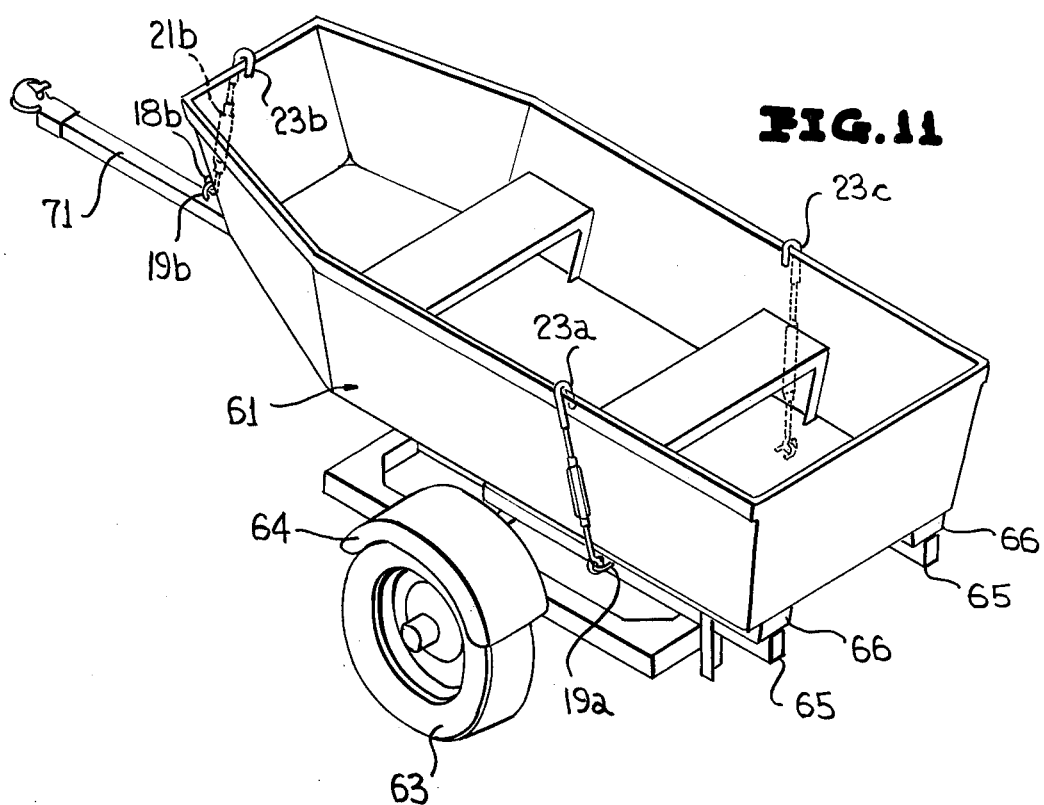
FIG. 11 is a view, in perspective, of a Jon boat secured to a trailer.

FIGS. 9, 10 and 11 disclose a suitable anchoring device for connecting a relatively small boat such as a Jon boat 61 to a trailer. The trailer includes axle 62, tire 63, fender 64, frame member 65 and horizontal runner 66. The boat rests on the horizontal runner 66 and may be slid therefrom.

The anchoring device of FIG. 9 may be the same as the device described in connection with FIG. 8. However, the U bolt 19a is secured horizontally to frame member 65 such that a nearly right angle is formed between U bolt 19a and eye bolt 17a by virtue of the pivotal gripping occasioned by the eye 18a of eye bolt 17a. Again a hexagonal sleeve 21a is pictured connecting the anchoring hook 23 between it and the gunwale of boat 61.

FIG. 10 shows the same construction used as the anchoring connection between tongue 71 of the trailer and boat 61. The only difference is that eye bolt 19b is connected vertically through apertures (not shown) in the tongue 71 with eye 18b providing for slight tilting and hexagonal sleeve 21b serving to tension anchoring hook 23b downwardly.

In FIG. 11 the preferred three positions of the anchoring devices are indicated by the anchoring hooks 23a, 23b and 23c. It can now be appreciated why the anchoring devices including hooks 23a and 23c have their U bolts fixed horizontally. This enables the anchoring devices to be dropped out of the way when the boat is being loaded or unloaded.

Figure 12:
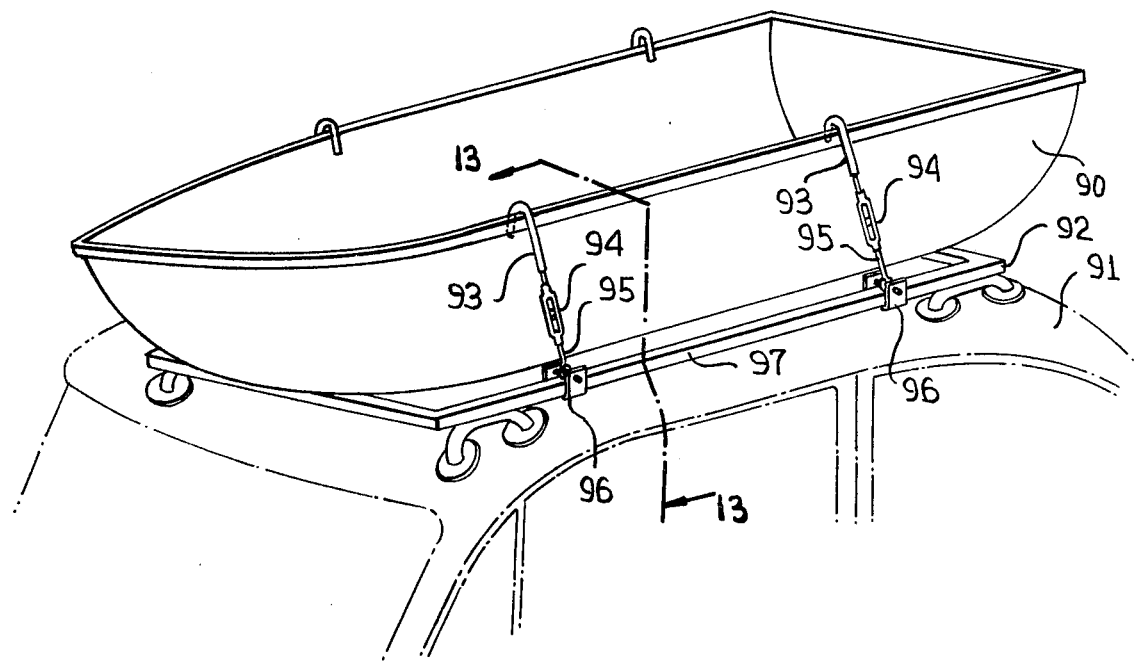
FIG. 12 is a view in perspective of a boat carried right side up on a car top carrier.
Figure 13:
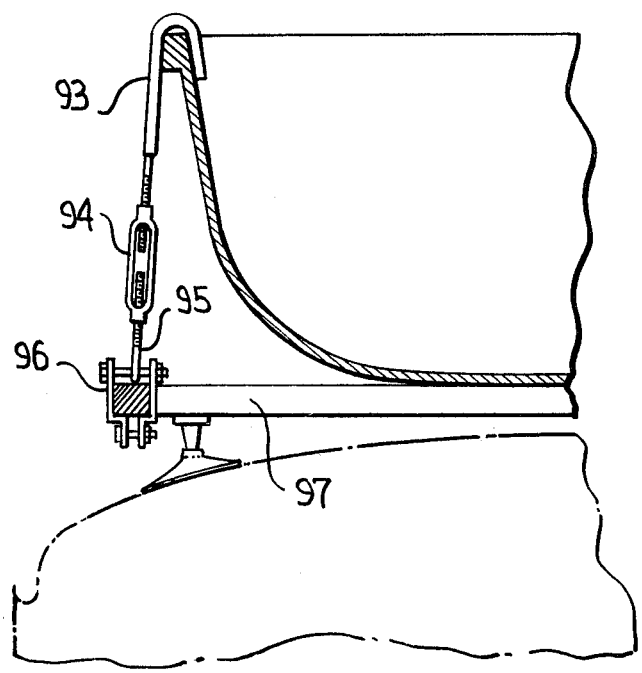
FIG. 13 is a detailed view of a portion of FIG. 12.

In FIG. 12, a boat 90 is depicted right side up clamped to vehicle 91 via car top carrier 92. Four anchoring devices are illustrated to hold the boat in this position. Each comprises a hook 93, hexagonal sleeve 94, eye bolt 95 and clamp 96, with the latter being attached to runner 97 — all pictured in greater detail in FIG. 13.

It should now be apparent that the various components may be used in different combinations to provide universal anchoring. The hexagonal sleeve offers the rust inhibiting feature over the turnbuckle, the sets of jaws are interchangeable, and for some purposes, the shackle and U bolt may be switched.

What is claimed is:

1. For use with a car top having a pair of rain gutters, each consisting of a side wall and a bottom wall along the respective sides of the car top, at least a pair of boat transport anchoring devices for anchoring a boat upright on a car top, each anchoring device comprising
    a. first means for locking engagement with the rain gutters of the car top,
    b. second means for engaging the gunwale of the boat,
    c. turnbuckle means connected between said first and second means for maintaining the boat firmly and directly against the car top for over the highway transport, and
    d. said first means comprising a two-jaw clamp adapted to be adjustably secured to opposite sides of the bottom wall of the rain gutter to apply equal pressure thereto and further comprising means connectible at one of its ends to one end of the turnbuckle, said other end of said connectible means being adjustably connected axially to the jaw applying pressure against the outside bottom wall of the rain gutter.

2. Anchoring apparatus for releasably securing a portable load or carrier member directly in contact with the top of a transport vehicle, comprising in combination
    a. a threaded shank having a hook on one end for engagement with said load or member;
    b. a turnbuckle means adjustable to receive the threaded shank at one end thereof;
    c. elongated means threaded along an extremity thereof also to be adjustably received by the turnbuckle at the end opposite said one end;
    d. jaws carried by the elongated means adjacent the end thereof opposite said extremity for engaging opposite sides of the bottom wall of the vehicle's rain gutter;
    e. one end of said jaws extending generally transversely of the axis of said elongated means and the other of said jaws being offset from said axis and having an offset portion extending generally parallel with said axis to close against said one jaw; and
    f. means for adjustably moving each of said jaws in a direction generally axially of the elongated means to cause clamping contact between the jaws and the rain gutter's bottom at a position offset from said axis, thereby equalizing pressure of jaws on both sides of rain gutter.

3. An anchoring device for attaching an upright boat to a vehicle, including a car top carrier supporting the boat, and said vehicle having a roof equipped with rain gutters comprising, in combination a plurality of clamping means for gripping the rain gutters;

each of said clamping means comprising a pair of jaws and, means for opening and closing the jaws of each clamping means;

one of said jaws of said pair contacting the outside bottom of the rain gutter and, the other of said jaws of said pair contacting the bottom of the trough within the rain gutter to clamp said jaws to the gutter;

said means for opening and closing the jaws of each clamping means comprising a threaded shank, separate means carrying the respective jaws threadably engaging said shank, and nuts engaging said shank to lock the jaws in clamping position;

said jaws comprising a pair of plates, each including a resilient fold, and the means for opening and closing the jaws further comprising, bolts and nuts adjustably controlling the spacing between the folds and hence the clamping of the jaws;

hook means for attachment to the load; and, adjustable means comprising a hexagonal sleeve for engaging the clamping means and the hook means to draw them together to tighten the boat to the vehicle.

4. An anchoring device for attaching an upright boat to a vehicle having a roof car top carrier supporting the boat, and said roof having rain gutters comprising, in combination clamping means for gripping the vehicle rain gutters;

hook means for attachment to the boat;

said hook means gripping the gunwale of the boat, each of said clamping means comprising a pair of jaws, means for opening and closing the jaws comprising, a threaded shank, separate means carrying the respective jaws threadably engaging said shank, and nuts engaging said shank to lock the jaws in clamping position; and, one of said jaws of said pair contacting the outside bottom of the rain gutter and, the other of said jaws of said pair contacting the bottom of the trough within the rain gutter to clamp to the gutter, and adjustable hexagonal sleeve means for engaging the clamping means and the hook means to draw them together to tighten the boat to the carrier.

5. The device of claim 4 wherein said jaws comprise a pair of plates each including a resilient fold, and the means for opening and closing the jaws comprise bolts and nuts adjustably controlling the spacing between the folds and hence the clamping of the jaws.

6. A boat anchoring device as claimed in claim 5 wherein said first mentioned means further comprises elongated threaded means connectible to one end of the turnbuckle and the jaws of said clamp are adjustably movable in the longitudinal direction of the elongated means and are adapted for contact offset from the elongated means.

7. A boat transport anchoring device as claimed in claim 4 wherein said two-jaw clamp comprises a pair of plate members each comprising resilient compressible fold means, bolt means for compressing said plate member compressible fold means on said opposite sides of the bottom wall of the rain gutter respectively; and a threaded hook connectible to one end of said turnbuckle, one of said plate members comprising means for receiving said hook.

8. An anchoring device for attaching an invested boat to a vehicle having a roof car top carrier supporting the boat, and said roof having rain gutters comprising, in combination clamping means for gripping the vehicle rain gutters;

hook means extending adjacent to the boat;

a strip of belting extending around the bottom of the boat to be gripped;

a right angled pressure bracket affixed adjacent each of the ends of the belting with the upper portion of each bracket being angled outwardly of the boat and apertured for receiving said hook means respectively;

said hook means gripping said brackets respectively;

each of said clamping means comprising a pair of jaws;

means for opening and closing the jaws comprising, a threaded shank, separate means carrying the respective jaws threadably engaging said shank, and nuts engaging said shank to lock the jaws in clamping position; and, one of said jaws of said pair contacting the outside bottom of the rain gutter and, the other of said jaws of said pair contacting the bottom of the trough within the rain gutter to clamp to the gutter, and adjustable hexagonal sleeve means for engaging the clamping means and the hook means to draw them together to tighten the boat to the carrier via said belting.

9. The device of claim 4 wherein said separate means comprise an internally threaded collar engaging said shank and carrying said other jaw; and an apertured plate threadably engaging said shank and having an offset member comprising said one jaw.

* * * * *